United States Patent

Wooten

[11] Patent Number: 6,061,687
[45] Date of Patent: *May 9, 2000

[54] LINKED LISTS OF TRANSFER DESCRIPTORS SCHEDULED AT INTERVALS

[75] Inventor: David R. Wooten, Spring, Tex.

[73] Assignee: Compaq Computer Corporation, Houston, Tex.

[ * ] Notice: This patent is subject to a terminal disclaimer.

[21] Appl. No.: 09/158,812

[22] Filed: Sep. 22, 1998

Related U.S. Application Data

[63] Continuation of application No. 08/706,594, Sep. 5, 1996, Pat. No. 5,832,492.
[60] Provisional application No. 60/003,191, Sep. 5, 1995, and provisional application No. 60/003,190, Sep. 5, 1995.

[51] Int. Cl.[7] ................................................. G06F 17/00
[52] U.S. Cl. .......................... 707/101; 707/100; 707/102
[58] Field of Search .............................. 710/107, 48, 100, 710/260, 152, 117; 707/100, 101, 102; 370/276; 711/5, 114, 209, 202, 167; 395/566, 866, 200.64, 356, 280, 842, 733, 825

[56] References Cited

U.S. PATENT DOCUMENTS

| | | | |
|---|---|---|---|
| 4,688,168 | 8/1987 | Gudaitis et al. | 710/107 |
| 4,730,308 | 3/1988 | Friedman et al. | 370/276 |
| 4,783,730 | 11/1988 | Fischer | 395/825 |
| 5,165,021 | 11/1992 | Wu et al. | 395/200.64 |
| 5,249,265 | 9/1993 | Liang | 345/358 |
| 5,276,874 | 1/1994 | Thomson | 707/102 |
| 5,301,275 | 4/1994 | Vanbuskirk et al. | 710/48 |
| 5,301,287 | 4/1994 | Herrel et al. | 711/202 |
| 5,317,692 | 5/1994 | Ashton et al. | 711/5 |
| 5,396,632 | 3/1995 | Gillet | 710/260 |
| 5,448,702 | 9/1995 | Garcia, Jr. et al. | 710/100 |
| 5,448,709 | 9/1995 | Chandler et al. | 710/152 |
| 5,469,548 | 11/1995 | Callison et al. | 711/114 |
| 5,513,368 | 4/1996 | Garcia, Jr. et al. | 395/842 |
| 5,602,995 | 2/1997 | Hendel et al. | 711/209 |
| 5,602,998 | 2/1997 | Alferness et al. | 395/566 |
| 5,621,898 | 4/1997 | Wooten | 710/117 |
| 5,742,847 | 4/1998 | Knoll et al. | 395/866 |
| 5,778,445 | 7/1998 | Ooe et al. | 711/167 |
| 5,832,492 | 11/1998 | Wooten | 707/101 |

OTHER PUBLICATIONS

Yeong–Fong Lin, C. Bernard Shung, Fault–Tolerant Architectures for Shared Buffer Memory Switch, Dept. or Electronics Engineering and Institute of Electronics National Chiao Tung University, Hsinchu, Taiwan, R.O.C. IEEE, New York, NY, USA, vol. 6, pp. 61–66.

Donald Knuth, "The Art of Computer Programming", Addison–Wesley Publishing Company, Inc. pp. 422–447.

*Primary Examiner*—Wayne Amsbury
*Assistant Examiner*—Thuy Pardo
*Attorney, Agent, or Firm*—Akin, Gump, Strauss, Hauer & Feld, LLP

[57] ABSTRACT

A computer system including a serial bus host controller and host controller driver. The host controller driver providing data structures for the host controller to operate on. The data structures having a linking mechanism for processing lists of descriptors, and alternate buffer configurations for receiving data from the serial bus devices.

20 Claims, 4 Drawing Sheets

LINKED LISTS OF TRANSFER DESCRIPTORS SCHEDULED AT INTERVALS

SPECIFICATION

This is a continuation of Ser. No. 08/706,594, filed Sep. 5, 1996, issued Nov. 3, 1998 as U.S. Pat. No. 5,832,492, which claims the benefit of U.S. Provisional Application No. 60/003,191, filed Sep. 5, 1995, and U.S. Provisional Application No. 60/003,190, filed Sep. 5, 1995.

BACKGROUND OF THE INVENTION

1. Field of the Invention

The invention relates to a method of managing scheduled transfers, and more specifically to a method of linking lists of scheduled transfers, especially for serial bus transfers.

2. Description of the Related Art

Computer systems are becoming ever more powerful with each passing moment. Many new advanced bus structures such as the PCI or Peripheral Component Interconnect bus have been developed to allow greater performance of the computer system. Additionally, new devices and uses are being developed for the computer systems. In the past the computer has been essentially a stand-alone device or networked with other computer systems. However, today the modern personal computer is becoming a much more connected and multimedia oriented system. For example, now high speed video and audio functions are becoming commonplace and the integration with the telephone system has already begun.

However, many of these new features and existing devices such as the keyboard, mouse and serial and parallel ports are well below the ultimate bandwidth or capability of the advanced buses such as the PCI bus. Therefore, it is not efficient to connect each one of the functions and devices to the PCI bus directly, as this would impact bus loading and greatly increase overall costs. Additionally, many of these new functions are essentially serial in nature, with the data transferred in a bit stream rather than over a parallel bus structure. This is provided for many reasons, such as reduced wiring costs, and can be done because of the lower data rates which are required.

Therefore, it has been proposed to develop a serial bus architecture to connect all of these various lower bandwidth devices. The universal serial bus (USB) is organized with a host controller (HC) having a series of ports, which can then be connected either directly to devices or functions or to further hubs which have below them further devices or functions. A hub or the host controller may in addition incorporate functions if desired. In this manner a tree structure can be developed to allow a reasonable number of functions or devices to be attached to the serial bus system.

The host controller connects to a bus in the computer system, for example the PCI bus. It is desirable for the bus to support 32 bit addressing, bus mastering and guaranteed access latency. By having the host controller act as a concentrator, only a single connection to the PCI bus is necessary. The connection is better able to utilize the performance of the PCI bus without requiring numerous connections. The host controller, each hub, and each function or port contain particular control registers and control logic for doing set up and initialization operations.

The USB devices are accessed by a unique USB address. Each USB device additionally supports one or more endpoints with which the computer system may communicate. Four basic types of data transfers are defined in the USB system. The first type is isochronous transfers, which are characterized as periodic, continuous communication between host and device typically used for time-sensitive data/control, such as telephony information or audio information. The second type is bulk transfers, which is characterized by non-periodic, large bursty communication typically used for transfers that can be delayed until bus band width is available, such as printer operations and conventional serial port operations. The third type is control transfers, which are characterized by bursty, non-periodic, host software initiated requests/response communications typically used for command/status operations. The fourth type of transfer, called interrupt transfers, are characterized as small bursty, non-periodic, low frequency, device-initiated communications typically used to notify the host of device service needs, such as is required for keyboard, mouse, pointing device and pen interfaces.

Information is broadcast over the USB from the host controller in a series of packets, with the host controller acting as the bus master and hubs and devices only responding upon request or polling access of the host controller. The packet types include data packets, token packets for use from host to device, a handshake packet and a special control packet. Data packets are the isochronous, asynchronous block, and asynchronous control types. Token packets allow transfer of data packets. Handshake packets are used to perform a ready handshake after transfer of a data or control packet to acknowledge successful receipt or indicate unsuccessful receipt. Special control packets are used for logical reset and status request transfers. Packets are scheduled into queues for transmission over the serial bus in a time division multiplexed fashion.

Each USB transaction begins when the host controller, on a scheduled basis, send a USB packet describing the type of transfer, the USB device address and the endpoint number. This packet is the token packet. The USB device that is addressed selects itself by decoding the appropriate address fields. In a given transaction, data is transferred either from the host to a device or from a device to the host. The direction of data transfer is specified in the token packet. The source of the transfer then sends a data packet or indicates it has no data to transfer. The destination responds with a handshake packet indicating whether the transfer was successful.

Each device and port on a hub or the host controller includes the capabilities to handle the low level bus transfer protocol between the particular node of the appropriate hub and the device itself. Thus, a relatively simple transfer protocol, with a limited number of packet types is defined. More details on the serial bus architecture are provided in the Universal Serial Bus Specification 0.9, dated Mar. 20, 1995, available from Intel Corp. This specification is hereby incorporated by reference.

The computer system communicates to the USB devices via hardware and software layers and interfaces. The host controller and USB devices are primarily hardware based with the USB devices connecting to the host controller in the manner described above. A host controller driver (HCD) and USB driver are primarily software based and provide the software portion of the architecture. The host controller is responsible for communicating information between the host controller driver and the USB devices. The host controller driver is responsible for communicating information between the USB driver and the host controller. A host controller interface (HCI) is the bridge between software (HCD) and hardware (HC).

The USB does not provide a mechanism for attached devices to arbitrate for use of the bus. As a consequence, arbitration for use of the serial bus is "predictive" with the host controller and host software assigned the responsibility of providing service to devices when it is predicted that a device will need it. Usage of the serial bus varies widely among the different data transfer types (isochronous, interrupt, bulk and control) making the task of managing transfers and memory difficult.

Additionally, interrupts on the USB are controlled by the host controller. Each frame, a list of devices to be polled for interrupts is traversed. The host controller issues a token packet to the device wherein if the device needs servicing it can respond to the token packet, thereby initiating an interrupt. Since devices have different servicing requirements, only certain devices are polled each frame. Other devices may be polled much less frequently. When interrupts have been serviced, the interrupt is removed from the list.

Thus, it is anticipated that the transfer lists and the interrupt list may vary greatly from one frame to another. As a result, the overhead from managing these lists and the related memory space requirements will vary from frame to frame. Therefore, it is desirable to provide simplified data structures to the host controller thereby simplifying the operation of the host controller, minimizing memory access and size requirements and providing a simple method of adding and removing devices from the servicing lists.

SUMMARY OF THE INVENTION

A computer system according to the present invention includes a serial bus for communicating with serial bus devices and accompanying a host controller. Each serial bus device may have more than one endpoint for identifying communications processes. A host controller driver (HCD) provides a software layer for system software to communicate with the host controller.

The host controller driver sets up lists of transactions for the host controller to operation on during serial bus frame intervals. The lists are comprised of endpoint descriptors and transfer descriptors. Endpoint descriptors may be linked to other endpoints descriptors to create a list of endpoint descriptors. Each endpoint may further link to the head of a transfer descriptor list for processing transactions of the endpoint. The structure of the descriptors provides the host controller with a convenient method of linking and unlinking the descriptors as they are processed.

The lists are used for isochronous, interrupt, control and bulk type transfers. The interrupt lists are indexed according to the current frame number. The end of each list is linked to the beginning of the next highest priority list so that during frame processing the host controller may efficiently process the lists.

Data is stored into system memory by the host controller according to a memory data buffer structure of the transfer descriptors. Transfers greater than a single page are handled by either a virtual or physical configuration. In a virtual configuration, a current buffer pointer is incremented after receiving data to indicate the next data location. If the pointer crosses a page boundary, the next page is indicated by a buffer end pointer. Thus, only two pointers are needed to describe a page crossing buffer, and the pages need not be contiguous.

In a physical configuration, page crossings are insignificant. The current buffer pointer is incremented after data is received. When the current buffer pointer is equal to the buffer end pointer, the buffer limit has been reached. Thus, the same buffer descriptors alternatively describe a memory data structure that may cross many page boundaries and be larger than two pages.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
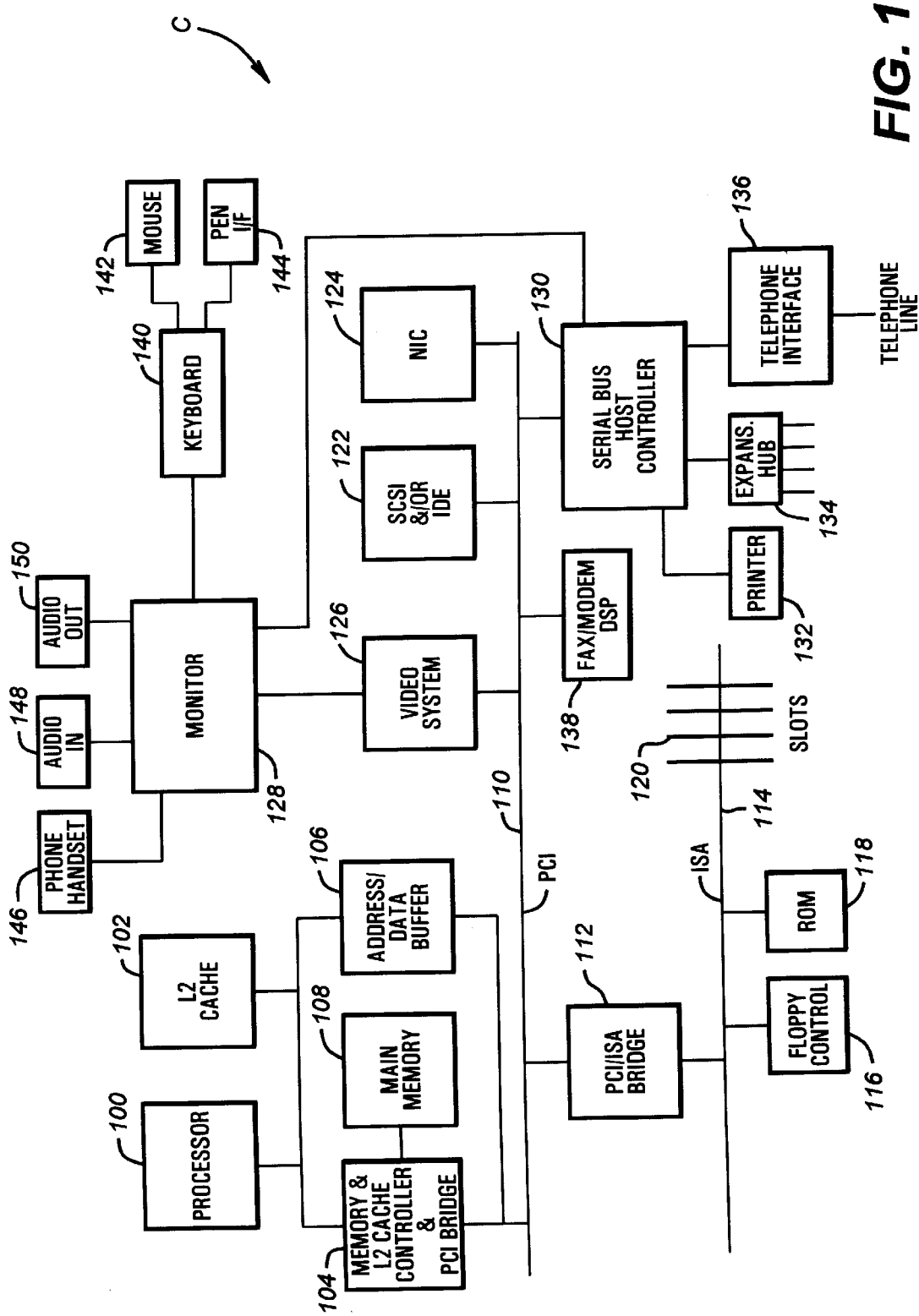
FIG. 1 is a block diagram illustrating a computer system according to the preferred embodiment.

Referring now to FIG. 1, the computer system C according to the preferred embodiment is generally shown. The computer system C includes a processor 100 such as a Pentium® or 486 processor by Intel or their equivalents. It is understood that other processors could of course be utilized. The processor 100 is connected to a second level or L2 cache 102 and to a memory and L2 cache controller and PCI bridge 104 and address and data buffer connected between the memory and L2 cache controller 104 and the address and data buffer 106. It is understood that the processor 100, cache 102, memory and cache controller 104, address and data buffer 106 and main memory 108 form the processor system and processor to PCI bus bridge according to a PCI system. It is understood of course that alternate processor systems and high speed bus architectures could be utilized if desired. Further, the address buffering could be included in the PCI bridge 104.

The PCI bridge 104 and address and data buffer 106 are connected to a PCI bus 110 which performs the high speed high performance back bone of the computer system C. A PCI to ISA (Industry Standard Architecture) bridge 110 is connected between the PCI bridge 110 and an ISA bus 114. A floppy disk controller 116 is connected to the ISA bus 114, as is the system ROM (read only memory) 118. The ROM 118 contains BIOS (basic input/output services) code for testing and initializing the computer system C and the serial bus. Additionally, there may be a plurality of ISA slots connected to the ISA bus 114 for receiving interchangeable cards.

The majority of the devices are connected to the PCI bus 110. For example, a SCSI or IDE (Intelligent Drive Electronics) controller 122 is connected to the PCI bus 110 and to the associated disk drives and other devices (not shown). A network interface card (NIC) 124 is also connected to the PCI bus 110 to allow high performance network connections. Further, a video graphics system 126 is connected to the PCI bus 110 and to an associated monitor 128. A fax/modem DSP (digital signal processor) 138 can also be connected to the PCI bus 110 for fax and modem data processing. As noted, this is an exemplary computer system architecture and is provided for explanation, variations being readily apparent to one skilled in the art.

Of interest to the present description, a serial bus host controller 130 is also connected to the PCI bus 110. The serial bus host controller 130 of the illustrated embodiment acts as both a host controller and a hub, with various hubs and functions connected to the host bus controller 130. For example, a printer 132 is connected to one port of the serial bus host controller 130, while an expansion hub 134 is connected to a second port. The expansion hub 134 provides further expansion capabilities, such as connecting to a keyboard 140 according to the present invention. The keyboard 140 further acts as a hub itself and a node, in that it is connected to the monitor hub but further contains ports to connect to the mouse 142 and a pen or stylus pointing device interface 144. This further physical connection is appropriate as those are the primary input devices and they are in most cases generally relatively near the keyboard 140 to ease use of operation. The keyboard interface will be described in more detail below. A telephony interface 136 containing the necessary CODEC and DAA components is connected to a third port and also receives a telephone line. The telephone line can be any of the available types such as an analog line, an ISDN line, a PBX connection and so on.

In the illustrated embodiment, the monitor 128 further acts as a hub and as a node. The monitor 128 is thus connected to one port of the serial bus host controller 130. The node or device function of the monitor 128 allows configuration of the monitor 128 independent from the high speed data utilized in the video system 126. The monitor 128 preferably acts as a hub because of the conventional physical arrangement of a modern computer system. Preferably, the system unit which contains the other devices is located under the desk or in a relatively remote location, with only the monitor 128, a keyboard 140, a pointing device such as a mouse 142 or pen 144, a telephone handset 146, and microphone and speakers relatively accessible to the user. As the monitor 128 effectively forms the central core of this unit, it is logically a proper location for a hub. It is noted that, although, preferably the keyboard is coupled to the monitor 128 for physical convenience, for simplicity of explanation herein the keyboard is shown coupled directly to the host controller 130. The telephone handset 146 could be connected to one port of the monitor 128 hub to receive digitized analog information either directly from the telephony interface 136 or as otherwise available, such as from an answering machine or voice mail function. The microphone is part of audio input circuitry 148 which is connected to a second port of the monitor 128 hub, while audio output circuitry 150 contains the speakers used for audio output. In all cases, each one of the particular devices connected over the serial bus system includes control ports and configuration registers which need to be accessed by the processor 100 via the serial bus host controller 130 to allow control and setup of the individual devices. Thus it can be seen that in the computer, the relatively lower data rate functions are connected to the serial bus host controller 130 according to the serial bus system.

Figure 2:
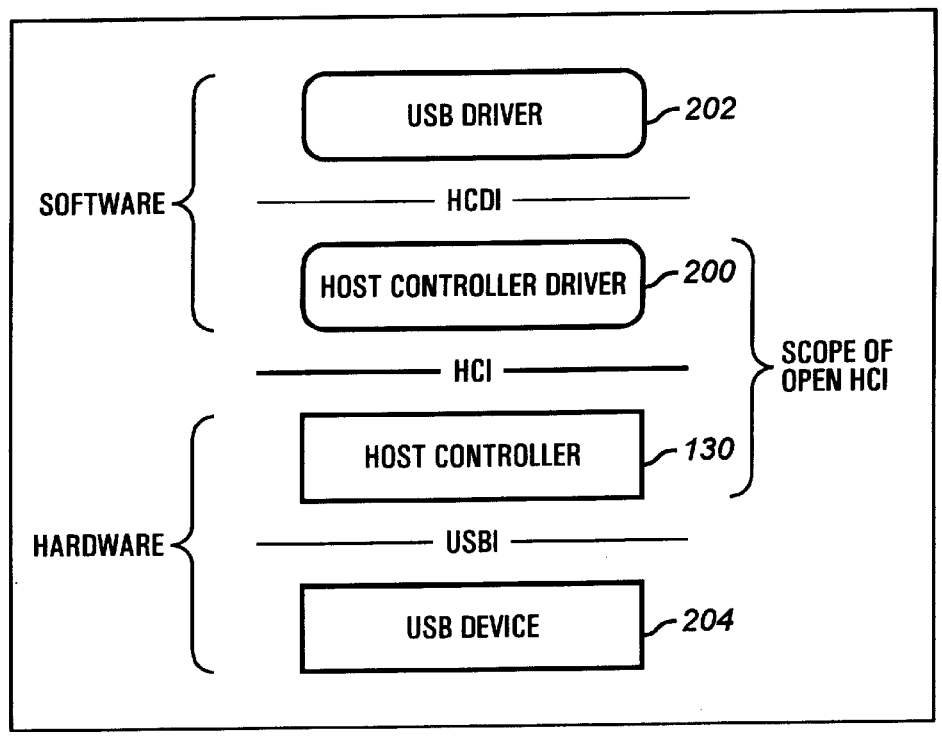
FIG. 2 is a functional block diagram illustrating the interaction of software and hardware.

The host controller 130 communicates to the computer system C through a software interface, called a host controller driver (HCD) 200, as shown in FIG. 2. The HCD software provides information between the host controller 130 and a serial bus driver 202. The serial bus driver 202 is system software dependent for interfacing an operating system of the computer system C to the serial bus and serial bus devices such as the monitor 128, generically referred to hereafter as serial bus devices 204.

The serial bus devices 204 are accessed by a unique serial bus address. Each serial bus device additionally supports one or more endpoints with which the computer system C may communicate to a serial bus device 204. For example a device might have one endpoint for data transmissions and another endpoint for status and configuration operations.

Four basic types of data transfers are defined in the serial bus system. The first type is isochronous transfers, which are characterized as periodic, continuous communication between host and device typically used for time-sensitive data/control, such as telephony information or audio information. The second type is bulk transfers, which is characterized by non-periodic, large bursty communication typically used for transfers that can be delayed until bus bandwidth is available, such as printer operations and conventional serial port operations. The third type is control transfers, which are characterized by bursty, non-periodic, host software initiated requests/response communications typically used for command/status operations. The fourth type of transfer, called interrupt transfers, are characterized as small bursty, non-periodic, low frequency, device-initiated communications typically used to notify the host of device service needs, such as is required for keyboard, mouse, pointing device and pen interfaces.

Information is broadcast over the serial bus from the host controller 130 in a series of packets, with the host controller 130 acting as the bus master and hubs and devices only responding upon request or polling access of the host controller. The packet types include data packets, token packets for use from host to device, a handshake packet and a special control packet. Data packets are the isochronous, asynchronous block, and asynchronous control types. Token packets allow transfer of data packets. Handshake packets are used to perform a ready handshake after transfer of a data or control packet to acknowledge successful receipt or indicate unsuccessful receipt. Special control packets are used for logical reset and status request transfers. Packets are scheduled into queues for transmission over the serial bus in a time division multiplexed fashion.

Each serial bus transaction begins when the host controller 130, on a scheduled basis, send a serial bus packet describing the type of transfer, the serial bus device address and the endpoint number. This packet is the token packet. The serial bus endpoint that is addressed selects itself by decoding the appropriate address fields. In a given transaction, data is transferred either from the host to a device or from a device to the host. The direction of data transfer is specified in the token packet. The source of the transfer then sends a data packet or indicates it has no data to transfer. The destination responds with a handshake packet indicating whether the transfer was successful.

Figure 3:
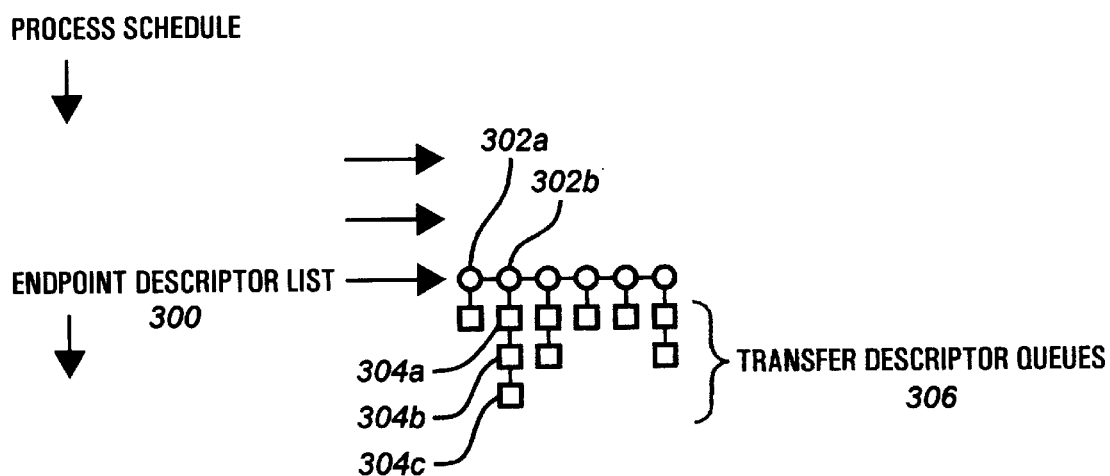
FIG. 3 is a process diagram illustrating the endpoint and transfer descriptor lists.

Referring now to FIG. 3, there are two levels of arbitration for the host controller 130 to select among the endpoints. The first level of arbitration is by data type. The second level of arbitration is circular.

Each endpoint needing service is in a endpoint list 300 of a corresponding data type (i.e., isochronous endpoints are in an isochronous list). Thus, there is an isochronous list, a control list, a bulk list and an interrupt list. The host controller 130 attempts to process all the endpoints in each list every frame. At the beginning of each frame, the interrupt and isochronous lists are assigned the highest priority. The interrupt list is serviced before the isochronous list, but the order could be switched. When all endpoints on both periodic lists have been serviced once, the control and bulk endpoints get the remainder of the frame time with control having priority over bulk data transfers.

Within a list, endpoints are given equal priority and serviced in a round robin fashion, ensuring that all endpoints of a certain type have more or less equal service opportunities. Within the lists, priorities are modified as endpoints are serviced and at periodic intervals, specifically at the start of each frame.

Figure 4A:
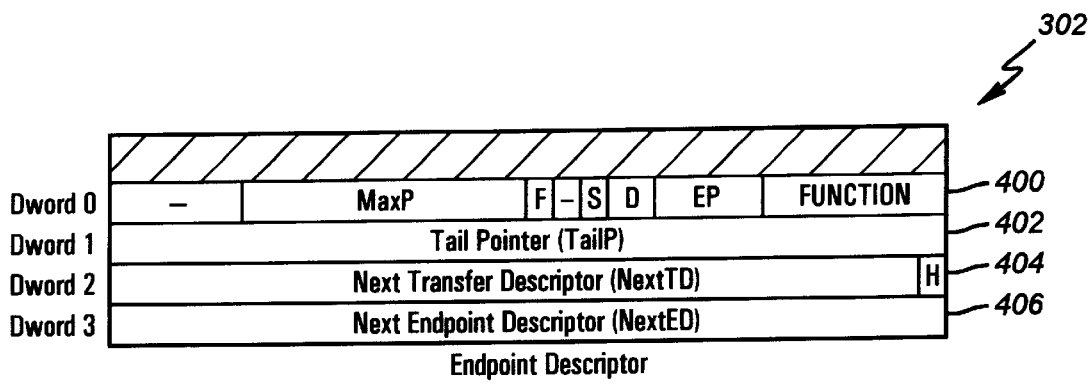
FIGS. 4A, 4B and 4C are format descriptors for an endpoint descriptor, a general transfer descriptor, and an isochronous transfer descriptor respectively.

From the perspective of the host controller 130, all four endpoint lists are identical in construction. Each list is comprised of a list of endpoint descriptors 302*a* and 302*b* (FIG. 3). Each endpoint descriptor 302*a* may link to another endpoint descriptor 302*b* to create one of the endpoint lists 300. An endpoint descriptor (ED) 302 (FIG. 4A) is a data structure which describes information necessary for the host controller 130 to communicate with a device endpoint, as described below. Referring to FIG. 4A, the endpoint descriptor 302 consists of a control field 400, a tail pointer field (TailP) 402, a next transfer descriptor field (NextTD) 404, and a next endpoint descriptor field (NextED) 406, as described in Table 1.

TABLE 1

Endpoint Descriptor Fields

| Name | Description |
| --- | --- |
| Function | This is the USB address of the function containing the endpoint that this Endpoint Descriptor controls |
| EP | This is the USB address of the endpoint within the function |
| D | This two bit field indicates the direction of data flow (IN or OUT.) If neither IN nor OUT is specified, then the direction is determined from the PID field of the Transfer Descriptor. the encoding of the bits of this field are:<br><br>Code    Direction<br><br>00b    From TD<br>01b    OUT<br>10b    IN<br>11b    From TD |
| S | Indicates the speed of the endpoint: full-speed (S = 0) or low-speed (S = 1.) |
| C | SW set this bit to cause the host controller to cancel the next TD on the TD list. |
| F | This bit indicates the format of the Transfer Descriptors linked to this Endpoint Descriptor. If this is a control, bulk or interrupt endpoint then F = 0 indicating that the general TD format is used. If this is an isochronous endpoint, then F = 1 indicating that the isochronous TD format is used. |
| MaxP | This field indicates the maximum number of bytes that can be sent to or received from the endpoint in a single packet. This is also the 'stride' of the buffer pointer for bulk, control and interrupt endpoints. |
| TP | If the upper 28 bits of TP and NextTD are the same, then the list contains no TD that the host controller can process. If TP and NextTD are different, then he list contains a TD to be processed. |
| NextTD | Points to the next TD to be processed for this endpoint. If the LSB of this entry is not 0, then the TD is not processes even if TP and NextTD are different. |
| NextED | If non zero, then this entry points to the next ED on the list. |

The endpoint descriptors 302 are linked in lists that are processed by the host controller 130. An endpoint descriptor 302*a* is linked to a next endpoint descriptor 302*b* when the NextED field 406 is non-zero. If the NextED field 406 is non-zero, then the field is interpreted as the address pointer to the next endpoint descriptor 302*b*. If the field is zero, or NULL, then this endpoint is interpreted as the last endpoint on the list. Thus, the host controller 130 can process an entire endpoint list 300 once the first endpoint descriptor 302*a* is known.

A new endpoint may be linked to the endpoint list 300 at any point in the list. Linking a new endpoint descriptor to the endpoint list is accomplished by placing the NextED pointer 406 of an existing ED 302 into the NextED field 406 of the new ED and writing the memory address of the new ED into the NextED field 406 of the existing ED 302. Removing or unlinking an endpoint from the list is accomplished by placing the NextED pointer 406 of the retired endpoint into the NextED field 406 of the endpoint presently pointing to the retired endpoint.

An endpoint descriptor 302 is the main element in the lists processed by the host controller 130. However, each endpoint descriptor 302 may have a certain number of subelements associated with it, called transfer descriptors (TD) 304*a* and 304*b* (FIG. 3). Generally, a transfer descriptor 304 describes a process or operation pertaining to the endpoint. The processes described by the transfer descriptors are processed by the host controller 130 in the order received. For example, if the endpoint is for data transfers, one transfer descriptor 304*a* may describe the attributes for transferring a certain data block from the host controller 130 to the device, while a next transfer descriptor 304*b* may describe a different process where a different data block is transferred from the device to the host controller 130.

Endpoint descriptors 302 are coupled to the transfer descriptors 304 by linking to one transfer descriptor. If more than one transfer descriptor 304 is in the TD list, the TD's are coupled together in a linked list 306, thus, all transfer descriptors in a linked list belong to a single endpoint descriptor. The TD list 306 has a "head" or first TD 304*a* and a "tail" or last TD 304*c*. Once the endpoint descriptor 302*b* is linked to the head TD 304*a*, the TD list 306 can be traversed by the host controller 130. When the host controller 130 accesses an endpoint descriptor 302, it determines if there is a transfer descriptor 304 linked to the endpoint descriptor that can be processed. It accomplishes this by examining the TailP 402 and NextTD 404 pointers, as described below.

Figure 4B:
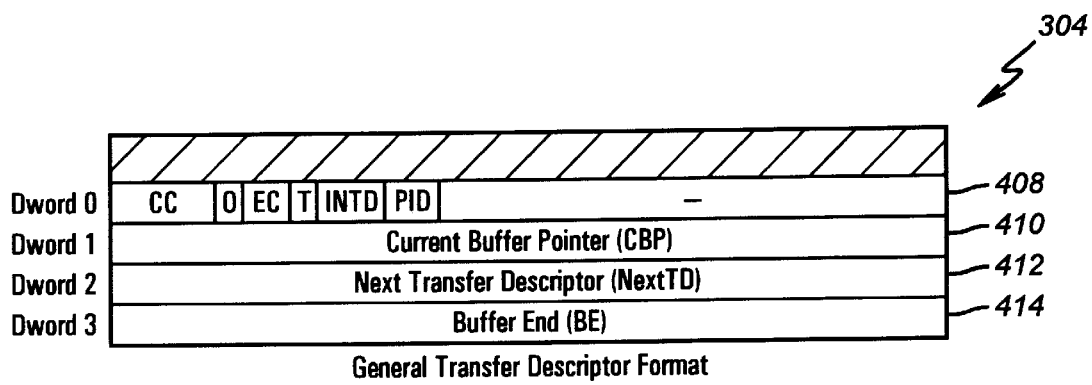
Figure 4C:
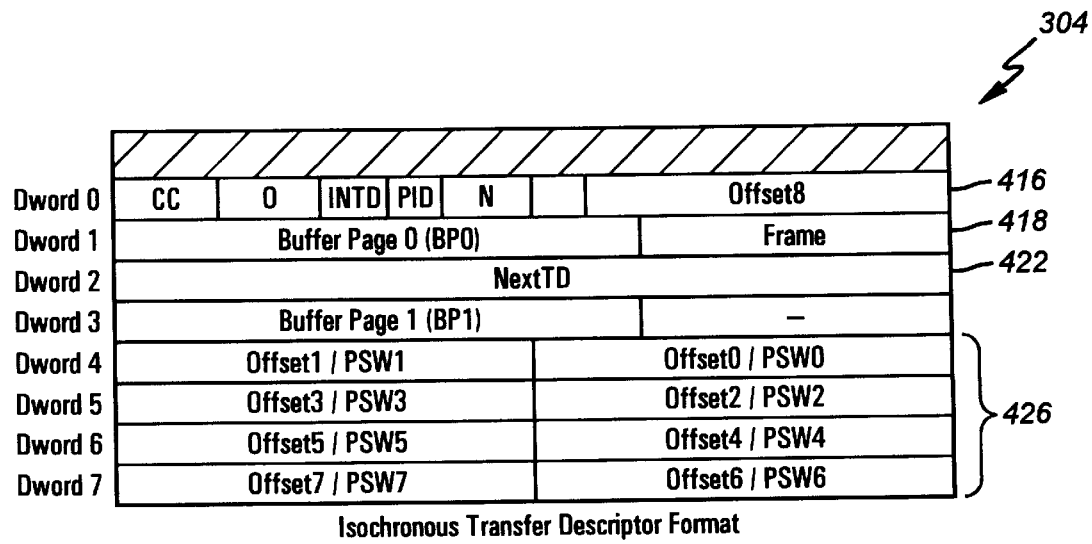

Before continuing with the description of the linked lists, more detail on the transfer descriptors 304 is deemed relevant. A transfer descriptor (TD) 304*a* is a data structure which describes information necessary for the host controller 130 to transfer a block of data to or from a device endpoint. Transfer descriptors 304 come in two types: general and isochronous, as shown in FIGS. 4B and 4C respectively. General transfer descriptors (GTD's) are used for interrupt, control, and bulk endpoints. Isochronous transfer descriptor's (ITD's) are used only for isochronous endpoints.

Referring to FIG. 4B, the transfers for control, bulk, and interrupt all use the same format for their transfer descriptor. This general transfer descriptor 304 is a 16-byte host memory data structure that is aligned to a 16-byte boundary. A general transfer descriptor 304 is comprised of a control field 408, a current buffer pointer field (CBP) 410, a next transfer descriptor (NextTD) field 412, and a buffer end (BE) field 414, as also shown in Table 2.

TABLE 2

General Transfer Descriptor Fields

| Name | R/W | Description |
| --- | --- | --- |
| PID | R | This two bit field indicates the PID to be used for the token. This field is only relevant to the host controller if the PID field in the Endpoint Descriptor was set to 00b or 11b indicating that the PIP determination is deferred to the Transfer Descriptor. The encoding of the bits within the byte for this field are:<br><br>Code    PID Type    Data Direction<br><br>00b    Setup    to endpoint<br>01b    OUT    to endpoint<br>10b    IN    from<br>11b    Reserved |
| INTD | R | This field contains the interrupt delay count for this Transfer Descriptor. When a Transfer Descriptor is complete and moved to the done list, INTD is used to determine who long the interrupt |

TABLE 2-continued

General Transfer Descriptor Fields

| Name | R/W | Description |
|---|---|---|
| | | associated with the completion of this Transfer Descriptor may be delayed. If INTD is not 111b, then the hose controller may wait the indicated number of frames before generating an interrupt to the host processor (a value of 0 indicates that the interrupt is to be generated at the end of the current frame.) If INTD is 111b, then there is no interrupt associated with completion of this Transfer Descriptor. |
| T | R/W | This bit is the data toggle bit. It is used to generate/compare the data PID value (DATA0 or DATA1). It is updated (inverted) after each successful transmission/reception of a data packet. |
| EC | R/W | For each transmission error, this value is incremented. If EC is 2 and another error occurs, the error type is recorded in the CC field and placed the done list and when NextTD in the ED is updated, the LSb will be set. When a transmission completes without error, EC is reset to zero so that a Transfer Descriptor will not be cancelled unless there are three consecutive transmission errors. |
| CC | R/W | This field contains the completion code when the Transfer Descriptor is moved to the done list. |
| CBP | R/W | Contains the physical address of the next memory location that will be accessed for transfer to/from the endpoint. A value of 0 indicates a zero length packet or, if the TD is on the done list, that all bytes of the TD have been transferred. |
| NextTD | R | If non zero, then this value points to the next TD on the list of transfer descriptors linked to the endpoint. |
| BE | R | Contains physical address of the last byte in the buffer for this TD. |

Referring to FIG. 4C, isochronous descriptors are used for isochronous endpoints. The isochronous descriptor is a 32-byte structure in memory aligned to 32-byte boundaries. The isochronous descriptor contains eight double-words (dwords) consisting of: a control dword 416, a frame field 418, a buffer page 0 (BP0) field 420, a next transfer descriptor dword 422, a buffer page 1 (BP1) field 424, and eight offset/packet status words 426.

TABLE 3

Isochronous Transfer Descriptor Fields

| Name | R/W | Meaning |
|---|---|---|
| PID | R | This two bit field indicates the PID to be used for the token. This field is only relevant to the host controller if the PID field in the Endpoint Descriptor was set to 00 indicating that the PID determination is deferred to the Transfer Descriptor. The encoding of the bits within the byte field for this field are:<br><br>PID Code / Data Type / Direction<br>00b / Setup / to endpoint<br>01b / OUT / to endpoint<br>10b / IN / from<br>11b / Reserved |
| N | R | Number of packets (frames) of data described by this TD. N = 0 implies 1 packet and N = 7 implies 8. |
| Frame | R | This field contains the low order five bits of the frame number in which the first packet of the Transfer Descriptor is to be sent. |
| INTD | R | This field contains the interrupt delay count for this Transfer Descriptor. When a Transfer Descriptor is complete and moved to the done list, INTD is used to determine how long the interrupt associated with the completion of this Transfer Descriptor may be delayed. If INTD is not 111b, then the host controller may wait the indicated number of frames before generating an interrupt to the host processor (a value of 0 indicates that the interrupt is to be generated at the end of the current frame.) If INTD is 111b, then there is no interrupt associated with completion of this Transfer Descriptor. |
| CC | R/W | This field contains the completion code when the Transfer Descriptor is moved to the done list. |
| BPO | R | The 20 bits of this field contain the physical page number that contains the first byte of the data buffer used by this TD. |
| NextTD | R | If non zero, then this value points to the next TD on the list of transfer descriptors linked to the endpoint. |
| BE | R | Contains physical address of the last byte in the buffer for this TD. |
| OffsetN | R | Difference between two offset values is used to determine the size of the packet buffer used in a particular frame. Bit 12 of an entry indicates whether the address is in the physical memory page indicated by BPO or BE. |
| PSWN | W | Before the indicated packet is transferred by the host controller, the OffsetN/PSN entry is an Offset. After the packet is transferred by the host controller, the entry becomes a Packet Status Word (PSW) which is written by the host controller. |

As mentioned above, an endpoint descriptor 302 may link to a transfer descriptor 304. If in an endpoint descriptor, the upper 28 bits of TailP 402 and NextTD 404 are identical, then the endpoint is interpreted as not having any transfer descriptors to process. If NextTD 404 and TailP 402 are not the same, then there is a transfer descriptor 304 in the TD list 306 available for processing. If there are no transfer descriptors present, then NextTD 404 and TailP 402 are identical and point to the NULL queue which acts as a place holder for when a TD is received. When a new transfer descriptor is added to the TD list 306, the new TD is linked to the end of the TD list and a another place holder is created. This is accomplished by copying the contents of the new transfer descriptor into the existing place holder, setting the NextTD field 404 in the newly added transfer descriptor to a new place holder location, and advancing the TailP pointer 402 of the endpoint descriptor 302 to point to the newly created place holder.

Both types of transfer descriptors 304 (general and isochronous) provide a means of specifying a buffer that is up to two pages, or 8,192 bytes long (each page being 4096 bytes long). Additionally, if the data buffer of a transfer descriptor 304 crosses a page boundary, the pages can be physically disjoint pages thereby creating a virtual buffer. In this way, even though the pages are physically disjoined, the transfer descriptor 304 allows the "scattered" buffer to appear as one "gathered" buffer to the host controller 130. The scatter/gather capabilities of the data structure eliminate most of the problems associated with forcing buffers to be physically contiguous.

A general transfer descriptor 304 (FIG. 4B) includes a current buffer pointer (CBP) 410 for indicating the next memory location that will be accessed during a data transfer, and a buffer end (BE) 414 for indicating the physical address of the last byte of the buffer. When the host controller 130 fetches a general transfer descriptor 304, it gets the address of the next data storage location from the current buffer pointer 410. If the current buffer pointer 410 is 0, then the packet size will be 0, regardless of the setting of the MaxP field (control 400) in the endpoint descriptor 302.

If the data transfer is an IN (meaning from a device to host controller 130), the host controller 130 reads the current buffer pointer 410 from the endpoint descriptor 302 and writes the data to the location specified by the CBP 410. If the transfer is an OUT (meaning from the host controller 130 to a device), the host controller 130 reads from the location specified by the current buffer pointer 410 and sends the data to the endpoint. After each packet is transferred, the current buffer pointer 410 is updated according to the number of bytes transferred, as indicated by MaxP. The buffer end pointer 414 indicates the last byte location of the buffer. Overrun and underrun conditions are reported to the computer system by the host controller 130.

As data is transferred to/from the current buffer pointer address, the current buffer pointer value may cross a 4k page boundary. If it does, the upper 20 bits of the buffer end field 414 are substituted for the current value of the current buffer pointer 410.

An alternative data structure to the above described "virtual" buffer is a purely "physical" buffer. A bit in the transfer descriptor 304 (not shown) determines whether the buffer fields are interpreted as virtual descriptors or physical descriptors. If set to physical, the buffer is one contiguous buffer extending from the address specified in the current buffer pointer 410 to the buffer end pointer 414. Page boundaries are irrelevant, thus resulting in a buffer that can exceed the two page limitation of the virtual buffer descriptors.

The isochronous transfer descriptor (IDT) 304 (FIG. 4C) has buffer page crossing attributes similar to the general transfer descriptor, but since isochronous transfers generally include real time data, the transfers are tied to a particular frame. A frame field 418 in the IDT 304 indicates the frame in which the first packet of the IDT 304 is to be sent or received over the serial bus. The N field (control 416) indicates the number of frames of data (packets) are defined by the IDT with the maximum value for N being 111b, meaning 8 packets.

When the host controller 130 processes the IDT 304, it first determines which of the defined frames it is processing. This is computed by subtracting the frame field value from the low order 12 bits of the current frame number maintained by the host controller 130, thereby yielding a relative frame number. The relative frame number, denoted herein as R, is used to select two offset values from the IDT 304 (Offset and Offset+1) 426. OffsetR 426 is subtracted from OffsetR+1 426 to get the size of the data buffer. The data buffer should not be larger than the MaxP field of the corresponding endpoint descriptor.

The initial address of the transfer is determined by OffsetR 426. If bit 12 (the 13th bit) of OffsetR 426 is zero, then the initial buffer address resides in the physical memory page specified in buffer page 0 (BP0) 420. If bit 12 is one, then the initial buffer address resides in the physical page specified by buffer page 1 (BP1) 424. When the upper 20 bits are selected, the address is completed by using the low 12 bits of OffsetR 426 as the low 12 bits of the address. During a transfer to/from the buffer, the buffer address may cross a page boundary. If this occurs, BP1 424 is used as the buffer pointer page address and the transfer continues at offset 0 within that page.

If the transfer is an OUT, then the host controller 130 sends the indicated amount of data from the indicated buffer to the endpoint. If the transfer is an IN, then the host controller 130 receives up to the indicated buffer size bytes and places the data at the indicated buffer address. When the transfer is complete, the host controller overwrites OffsetR 426 with a transfer status word that indicates the condition of the transfer and, in the case of an IN transfer, the number of bytes actually received. The condition code in PSWR 426 is set for both IN and OUT. The size field is only relevant for IN transfers. The process of writing the condition code in OffsetR 426 changes the most significant bit from zero to one. This provides an indication that the packet was processed by the host controller and that the word contains a packet status word (PSW). When the last packet of the IDT 304 is transferred (R=N) and OffsetR 426 is modified to be a PSW, the IDT 304 is moved to a done queue and CC (control 416) in the IDT 304 is set to done without error.

The fundamental way work is accomplished on the serial bus by the host controller 130 is via the lists of endpoint descriptors 300 which in turn have a queue of transfer descriptors 306. While the host controller 130 is operating, it traverses the different endpoint descriptor lists 300 each frame. As the host controller processes each endpoint descriptor 302b, it performs work on the first enqueued transfer descriptor 304a for that endpoint descriptor. The transfer descriptor is updated to reflect the work which was done, and the host controller moves onto the next endpoint descriptor 302. At some point the work required by a transfer descriptor 304 is completed by the host controller, and the transfer descriptor 304 is put onto a done queue.

The host controller 130 performs periodic processing every serial bus frame, i.e., the interrupt and isochronous lists are processed every frame. However, as described below, the entire interrupt list is not processed each frame. Interrupts on the serial bus are controlled by the host controller 130. Interrupts provide a communication mechanism through which a serial bus device can send a message to the host controller 130.

Interrupts are initiated when an interrupt endpoint requests a guaranteed frequency of service. HCD 200 provides a service frequency greater than or equal to that requested by the endpoint. HCD 200 also provides a transfer descriptor 304 for addressing the interrupt endpoint.

The model of interrupt transfer types is that HCD 200 initiates a serial bus transaction, at the frequency alloted to the endpoint, according to the TD 304. If the serial bus endpoint does not wish to issue an interrupt, it will NACK the serial bus transaction. When the serial bus endpoint wants to issue an interrupt, it will deliver data to the serial bus transaction the next time the transaction occurs. The data may be valid data, or may be NULL data. HCD 200 continually retries an interrupt transaction until the endpoint successfully delivers data.

Interrupts are processed in the HCD 200 according to an interrupt table 500. The interrupt table 500 is a 32 entry table with each entry being a 32-bit pointer to an interrupt list. An entry to the interrupt table may also be NULL. If the entry is NULL, then no interrupts are processed for that frame. The interrupt table 500 is accessed once per frame by the host controller 130 by using the low order 5 bits of the current frame number as an index into the table entries. Thus, each table pointer 502 is accessed once every 32 frames.

The table entries 502 are pointers to an interrupt list 504 which is a list of endpoint descriptors 302 with each ED pointing to a queue of transfer descriptors 304 for that endpoint, as described above. An ED 302 for an interrupt endpoint may appear on multiple interrupt lists. The more lists in which an ED is linked, the greater its polling rate. An ED 302 that is in only one list will have a polling rate of once every 32 ms. An ED that is on two lists will have a polling rate of once every 16 ms. If an ED is linked into all 32 lists then it will have a polling rate of once per 1 ms or every frame. This list structure therefore provides a convienient structure for polling intervals of 1, 2, 4, 8, 16, and 32 ms.

The interrupt list 504 may be structured in a variety of ways. One way is to have a linked interrupt list with the slower polling rate interrupts linked to faster polling rate interrupts in one long list. With this arrangement, only a portion of the interrupt list is processed depending on the polling rate of the interrupts to be serviced. Since the 1 ms interrupts are linked to the slower polling rate lists, the 1 ms interrupts will be processed each frame. But during other frames the other lists may be traversed. For example, during a first frame only the 1 ms list is processed. During a second frame the 2 ms list is processed, which next causes the 1 ms list to be processed. During another frame, the entire list is processed.

An alternative to this single linked list is a structure where several independent linked lists are processed. Each frame an interrupt list comprised of endpoint descriptors is processed as described above. Endpoint descriptors appearing in more than one of the independent lists have a higher polling rate. An interrupt haveing a 32 ms polling rate appears in one interrupt list. It is irrelevant which of the independent lists a 32 ms interrupt is placed as long as it exists in only one list. However, independent endpoint interrupts may be placed in different interrupts lists.

Figure 5:
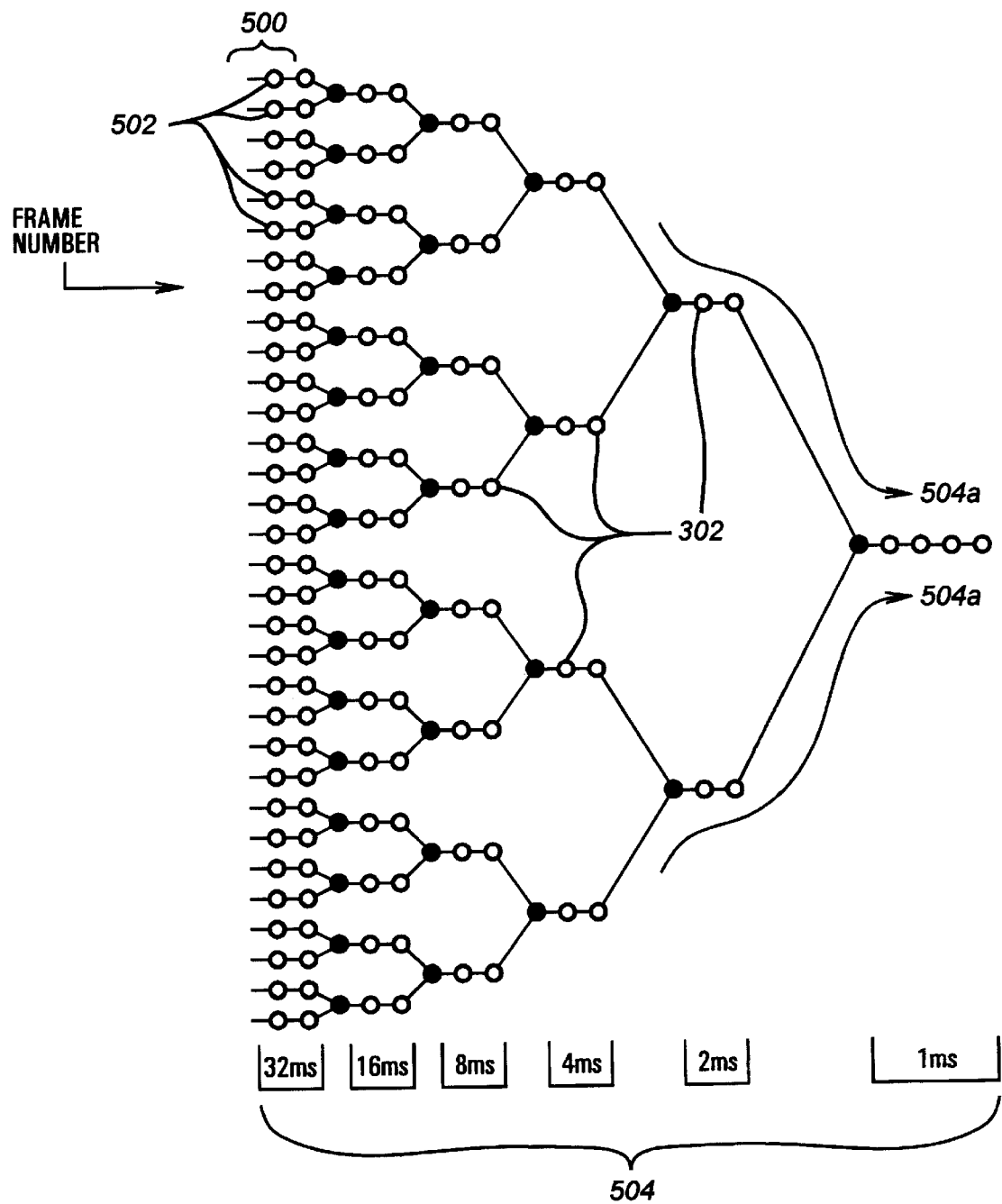
FIG. 5 is a process diagram illustrating an interrupt list.

A structure that is very versatile and requires less memory than the structures disclosed above is that of FIG. 5. Each frame, the frame number indexes into an interrupt table 500 which contains a pointer 502 to one of thirty-two 32 ms interrupt lists 504. Each of the thirty-two 32 ms interrupt lists link to one of sixteen 16 ms interrupt lists. Each of the sixteen 16 ms lists further link to one of eight 8 ms interrupt lists. Each of the eight 8 ms lists further link to one of four 4 ms interrupt lists. Each of the four 4 ms interrupt lists further link to one of two 2 ms lists. Each of the two 2 ms lists further link to a single 1 ms interrupt list. Thus, each frame, interrupts of each polling rate can be serviced. A grouping of endpoint descriptors 302 with the same polling rate that occur in the same frame is a sub-list 504a. The number of sub-lists at each polling rate is the same as the polling rate. For example, there can be two sub-lists 504a with polling rates of 2 ms with each list being processed on alternate frames.

Each interrupt list may contain interrupts or may be the NULL list. Preferably the HCD distributes the interrupts of same polling rates among the different interrupt lists of the same polling rate. Thus, by providing a tree-structure interrupt list, addition and removal of interrupts is very easily accomplished.

Access of the interrupt table 500 is the first activity performed by the host controller 130 at the beginning of each frame. This activity may be delayed due to completion of activities from the previous frame. The host controller 130 maintains a register (not shown) which is programmed by software and indicates the latest time in the frame at which processing of the interrupt list 504 may begin and still have an opportunity of completing within the allowed time. If the host controller 130 has not accessed the interrupt table 500 before the SOF timer reaches this value, a behind schedule error condition is flagged and an immediate hardware interrupt is raised into the system. This interrupt is not deferred until the end of the current frame. If the host controller signals this condition, it will not then start processing of the interrupt list 504 and will only scan the isochronous list for transfer descriptors 304 that will complete during the current frame. No interrupt or isochronous transfers will be run on the serial bus until software clears this error condition.

The last entry in each of the 32 interrupt lists 504 points to the first entry of the ED 302 of the isochronous list so that the isochronous list is queued up after the interrupts are processed.

The host controller 130 schedules transfers to endpoints on serial bus based on the structure of the four endpoint lists; bulk, control, interrupt, and isochronous. Of these lists, only the interrupt list is unique in the way that the list head is found, as described above. For bulk, control, and isochronous, the host controller 130 maintains a software accessible pointer 502 to the head of the list. For interrupt, 32 list heads are kept in memory with a list selected each frame. In addition to the head pointers 502, the host controller maintains three software accessible pointers to a next ED 302 for control, bulk, and an additional pointer that is used for both periodic lists (interrupt and isochronous).

The host controller selects a list to process based on a priority algorithm. At the beginning of each frame, the priority of the periodic lists is raised above that of either bulk or control. The next periodic ED pointer is located with a value from the interrupt table 500. As long as this pointer value is non-zero, the host controller will continue to process this list to the exclusion of both control and bulk.

The last entry of each of the 32 interrupt lists 504 points to the first entry of the isochronous ED list so that, barring time limits, processing of isochronous endpoints follows that of interrupt processing with the host controller 130 following a single list.

When the current pointer for the periodic ED 302 becomes 0, processing of periodic endpoints is complete and the periodic lists have no priority for the remainder of the frame. At this point, control and bulk list processing may resume. Based on a selection criteria described later, the host controller 130 will select either the bulk or control ED list 300 to process. The ED 302 pointed to by the current ED register is loaded and if the ED points to an available TD 304, a transfer to/from the endpoint is attempted. On completion of the transfer attempt, the current ED 302 for the list is updated and the selection criteria is again applied to determine if a control or bulk ED 302 will be processed.

When the current ED pointer for either bulk or control becomes 0, the host controller 130 will copy the current value of the corresponding head pointer into the current pointer and continue processing. The least significant bit (lsb) of the head pointer is a disable bit for the list. If a value with the lsb set is loaded into a current pointer, processing of that list is immediately suspended.

For a transfer to or from an endpoint to occur, a transfer descriptor 304 should be linked to a transfer descriptor queue associated with each ED 302. NextTD 404 and TailP 402 in an ED 302 define the TD queue. If NextTD 404 and TailP 402 are not the same, then NextTD 404 is a pointer to the TD 304 that will be processed when the host controller 130 reaches the ED 302.

The host controller driver (HCD) 200 queues to the list by using the value of TailP 402 to obtain the physical address of the last TD 304 queued to the ED 302. Since the TD 304 pointed to by TailP 402 is not accessed by the host controller 130, the HCD 200 can initialize that TD 304 and link at least one other TD 304 to it without creating a coherency or synchronization problem. After the new TD(s) 304 are linked, TailP 402 is updated extending the list of TD's that can be accessed and processed by the host controller, with TailP 402 again pointing to a TD 304 that can be initialized by the HCD 200. The HCD may not alter in any way any of the TD[]s 304 it has queued prior to the one pointed to by TailP 402 until either (1) they appear on the done queue, or (2) the ED 302 has been halted by the host controller 130 as indicated by the H bit (of next TD field), or (3) the ED 302 is removed from the list.

When the host controller 130 finishes processing a TD 304, it copies the NextTD 412 value from the just completed TD 304 into NextTD 404 of the ED 302 and sets the H bit of that value to 0 if the TD 304 completed without error or 1 if an error occurred.

When a TD 304 is complete (with or without an error), it is unlinked from the queue that it is on and linked to the done queue. The host controller 130 maintains a register (not shown) to the last TD 304 that was placed on the done queue. When a TD 304 is put on the done queue, the value of the register is written to NextTD 412 of the just completed TD 304 and the register is changed to contain the address of the TD 304 just completed. This causes TD's to be linked at the head of the done queue. The reason for linking at the head is that this allows the hardware to only maintain one pointer for the done queue and also allows the linking to the done queue to be done at the same time a the status update in a completed TD which saves a memory access (i.e., the same write that updates the status of a TD 304 to indicate that it is done can be extended to cause NextTD 412 to be updated to place the TD on the done queue).

Periodically, the host controller 130 will write the current value of its done queue head pointer into a memory location so that serial bus driver software 202 can complete processing of a TD 304. Nominally, the done queue is written to memory just before a frame interrupt condition is set. After the done queue head value is written to memory, the host controller 130 sets the value of its hardware head pointer to 0 and sets a done flag located in a host controllers register. As long as that flag is set, the host controller 130 may not write the done queue to memory.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A data structure in a memory for scheduling interrupts using a protocol linked list, the list comprising:
    a tree-structured interrupt list comprised of stages numbering x, each stage having a number of individual interrupt lists equal to $2^{x-1}$, two interrupt lists from each higher numbered stage linking to a single interrupt list of a next lower numbered stage to form a linked list, each interrupt list of a lower numbered stage being linked to only two interrupt lists of a higher numbered stage, each stage corresponding to a polling interval;
    a table having a number of entries corresponding to the number of interrupt lists of the highest stage, each entry containing a pointer to one of the interrupt lists of the highest stage; and
    an index of the table entries according to a frame number on the occurrence of a frame boundary.

2. The data structure of claim 1, wherein each individual list is a list of endpoint descriptors with each endpoint descriptor pointing to a queue of transfer descriptors.

3. The data structure of claim 2, wherein the endpoint descriptors define Universal Serial Bus endpoints.

4. The data structure of claim 2, wherein the transfer descriptors define general transfer descriptors and isochronous transfer descriptors.

5. The data structure of claim 4, wherein general transfer descriptors include:
    a next transfer descriptor field; and
    a buffer end.

6. The data structure of claim 4, wherein the isochronous transfer descriptors include:
    a control word; and
    a frame field.

7. The data structure of claim 2, wherein the endpoint descriptors define serial bus endpoints.

8. The data structure of claim 2, wherein the endpoint descriptors include:
    a next transfer descriptor field; and
    a next endpoint descriptor field.

9. A computer system, comprising:
    a processor;
    a serial bus host controller coupled to said processor; and
    a memory coupled to said processor and said serial bus host controller arranged to define a data structure, comprising:
        a tree-structured interrupt list comprised of stages numbering x, each stage having a number of individual interrupt lists equal to $2^{x-1}$, two interrupt lists from each higher numbered stage linking to a single interrupt list of a next lower numbered stage to form a linked list, each interrupt list of a lower numbered stage being linked to only two interrupt lists of a higher numbered stage, each stage corresponding to a polling interval;
        a table having a number of entries corresponding to the number of interrupt lists of the highest stage, each entry containing a pointer to one of the interrupt lists of the highest stage; and
        an index of the table entries according to a frame number on the occurrence of a frame boundary.

10. The computer system of claim 9, wherein each individual list is a list of endpoint descriptors with each endpoint descriptor pointing to a queue of transfer descriptors.

11. The computer system of claim 10, wherein the serial bus host controller is a Universal Serial Bus host controller and wherein the endpoint descriptors define Universal Serial Bus endpoints.

12. The computer system of claim 10, wherein the transfer descriptors define general transfer descriptors and isochronous transfer descriptors.

13. A computer system, comprising:
    a processor;
    a hard disk subsystem coupled to said processor;
    a serial bus host controller; and
    a memory coupled to said processor and said serial bus host controller arranged to define a data structure, comprising:
        a tree-structured interrupt list comprised of stages numbering x, each stage having a number of individual interrupt lists equal to $2^{x-1}$, two interrupt lists from each higher numbered stage linking to a single interrupt list of a next lower numbered stage to form a linked list, each interrupt list of a lower numbered stage being linked to only two interrupt lists of a higher numbered stage, each stage corresponding to a polling interval;

a table having a number of entries corresponding to the number of interrupt lists of the highest stage, each entry containing a pointer to one of the interrupt lists of the highest stage; and an index of the table entries according to a frame number on the occurrence of a frame boundary.

14. The computer system of claim 13, wherein each individual list is a list of endpoint descriptors with each endpoint descriptor pointing to a queue of transfer descriptors.

15. The computer system of claim 14, wherein the serial bus host controller is a Universal Serial Bus host controller and wherein the endpoint descriptors define Universal Serial Bus endpoints.

16. The computer system of claim 14, wherein the transfer descriptors define general transfer descriptors and isochronous transfer descriptors.

17. The computer system of claim 16, wherein the general transfer descriptors include:

a next transfer descriptor field; and a buffer end.

18. The computer system of claim 16, wherein isochronous transfer descriptors include:

a control word; and a frame field.

19. The computer system of claim 14, wherein the endpoint descriptors define serial bus endpoints.

20. The computer system of claim 14, wherein the endpoint descriptors include:

a next transfer descriptor field; and a next endpoint descriptor field.

\* \* \* \* \*